United States Patent
Masuoka et al.

(10) Patent No.: US 12,510,017 B2
(45) Date of Patent: Dec. 30, 2025

(54) DAMPING STRUCTURE OF INLINE SIX-CYLINDER ENGINE

(71) Applicant: Mazda Motor Corporation, Hiroshima (JP)

(72) Inventors: Taichi Masuoka, Aki-gun (JP); Yuki Nabetani, Aki-gun (JP); Tatsuhiro Ishida, Aki-gun (JP); Kazuhiko Yamamoto, Aki-gun (JP); Takashi Miyamoto, Aki-gun (JP); Yuki Date, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 18/928,570

(22) Filed: Oct. 28, 2024

(65) Prior Publication Data
US 2025/0188864 A1    Jun. 12, 2025

(30) Foreign Application Priority Data
Dec. 6, 2023    (JP) .................................. 2023-206464

(51) Int. Cl.
*F02B 75/20*    (2006.01)
*F16F 15/30*    (2006.01)
*F02B 75/18*    (2006.01)

(52) U.S. Cl.
CPC .............. *F02B 75/20* (2013.01); *F16F 15/30* (2013.01); *F02B 2075/1824* (2013.01)

(58) Field of Classification Search
CPC .... F02B 75/20; F02B 2075/1824; F16F 15/30
See application file for complete search history.

(56) References Cited

U.S. PATENT DOCUMENTS

| | | | | |
|---|---|---|---|---|
| 6,070,562 A | * | 6/2000 | Van Bezeij | F16J 9/02 384/429 |
| 2010/0059014 A1 | * | 3/2010 | Sicre | F02F 7/0053 123/195 H |
| 2012/0067322 A1 | * | 3/2012 | Andersson | F01M 11/0004 206/521 |

FOREIGN PATENT DOCUMENTS

| | | | |
|---|---|---|---|
| JP | 06185522 A | * | 7/1994 |
| JP | S63126611 U | | 8/1998 |
| KR | 2001066002 A | * | 12/1999 |

\* cited by examiner

*Primary Examiner* — Syed O Hasan
(74) *Attorney, Agent, or Firm* — Alleman Hall & Tuttle LLP

(57) ABSTRACT

A damping structure of an inline six-cylinder engine is provided, which includes pistons reciprocatably fitted in the six cylinders, respectively, a crankshaft disposed below the pistons in a vertical direction of a vehicle and coupled to the pistons via connecting rods, respectively, the crankshaft being rotatable about an axis, a cylinder block having a plurality of crank journal parts disposed below the crankshaft in the vertical direction to rotatably support the crankshaft between adjacent cylinders in the crankshaft, a flywheel fixed to a rear end of the crankshaft in the longitudinal direction of the vehicle, and a dynamic damper attached to a lower part of the cylinder block, at at least one location between two adjacent cylinders among second through fourth cylinders, the six cylinders being disposed in an order of first through sixth cylinders from a front side to a rear side in the longitudinal direction.

6 Claims, 14 Drawing Sheets

DAMPING STRUCTURE OF INLINE SIX-CYLINDER ENGINE

TECHNICAL FIELD

The present disclosure relates to a damping structure of an inline six-cylinder engine, and in particular to a damping structure of a reciprocating engine.

BACKGROUND OF THE DISCLOSURE

In an in-line 6-cylinder reciprocating engine (hereinafter, may simply be referred to as "engine(s)") which is longitudinally mounted inside an engine bay of a vehicle, vibration occurs when operating the engine. The vibration occurring in the engine propagates as a radiation sound into a vehicle cabin via a transmission, etc. From the viewpoint of securing the comfort of an on-board person, it is required to suppress the propagation of the radiation sound into the vehicle cabin. Note that, in the inline six-cylinder engine, since the radiation area is larger than in in-line 4-cylinder engines, a louder radiation sound propagates.

In order to suppress the propagation of the radiation sound into the vehicle cabin, it is possible to entirely cover the engine with sound insulation material. By covering the entire engine with the sound insulation material, it is possible to reduce the sound radiated outside the engine in all frequencies. However, it is difficult to insulate the sound to a target level at some resonance frequencies only by covering the engine with the sound insulation material.

In order to reduce the level at some of the resonance frequencies, JP1988-126611U proposes the following structure, for example.

This disclosed damping structure is constituted such that a plurality of main bearing caps are coupled integrally by an integral beam, and an inertial mass is attached to this integral beam via an elastic member. It is disclosed that this structure can effectively reduce the engine vibration, without increasing the size and weight of the integral beam itself, by attaching the inertial mass to the integral beam as described above.

However, the disclosed damping structure cannot fully reduce the vibration produced by the inline six-cylinder engine, and therefore, the radiation sound may propagate into the vehicle cabin. In the above disclosed structure, the inertial mass is attached at a location below the integral beam. However, since the attached location is not specified, it may be difficult to fully reduce the vibration.

SUMMARY OF THE DISCLOSURE

Thus, the present disclosure is made in view of solving the above problem, and aims at providing a damping structure of an inline six-cylinder engine capable of effectively decreasing vibration in the in-line 6-cylinder reciprocating engine which is longitudinally mounted in an engine bay.

A damping structure of an inline six-cylinder engine according to one aspect of the present disclosure is provided with six cylinders longitudinally mounted on a vehicle and disposed in series, and includes pistons reciprocatably fitted in the six cylinders, respectively, a crankshaft disposed below the pistons in an vertical direction of the vehicle, and coupled to the pistons via connecting rods, respectively, the crankshaft being rotatable about an axis, a cylinder block having a plurality of crank journal parts, the crank journal parts disposed below the crankshaft in the vertical direction, and configured to rotatably support the crankshaft between adjacent cylinders in the crankshaft, a flywheel fixed to a rear end of the crankshaft in a longitudinal direction of the vehicle, and a dynamic damper attached to a lower part of the cylinder block, at at least one location between two adjacent cylinders among second through fourth cylinders, the six cylinders being disposed in an order of a first cylinder, the second cylinder, a third cylinder, the fourth cylinder, a fifth cylinder, and a sixth cylinder from a front side to a rear side in the longitudinal direction of the vehicle.

In the damping structure of the inline six-cylinder engine of the above aspect, the dynamic damper is attached to the lower part of the cylinder block, at at least one location between the two adjacent cylinders among the second through fourth cylinders. Such a configuration is adopted because the flywheel is fixed to the rear end of the crankshaft. That is, since the flywheel is fixed to the rear end of the crankshaft, the crankshaft vibrates with a larger amplitude at a front end side thereof than a rear end side thereof in the longitudinal direction.

Here, as a result of the present inventors' diligent examination on the vibration during operation of the inline six-cylinder engine, they found that the crankshaft vibrates with a larger amplitude at a part between the second cylinder and the fourth cylinder. Thus, in the damping structure of the inline six-cylinder engine of the above aspect, by attaching the dynamic damper to the lower part of the cylinder block at at least one location between the two adjacent cylinders among the second through fourth cylinders in the longitudinal direction, vibrational energy can be absorbed effectively in the part where the amplitude is large.

In the damping structure of the inline six-cylinder engine of the above aspect, the dynamic damper may include a stationary part attached to a lower part of the crank journal part and extending downwardly from the lower part of the crank journal part, a beam part connected to a lower part of the stationary part and extending in the longitudinal direction, and two mass parts connected to connecting parts of the beam part, on the front side and the rear side, respectively, in the longitudinal direction, and extending in the lateral direction of the vehicle while being separated from each other in the longitudinal direction. The stationary part, the beam part, and the two mass parts may be formed integrally.

In the damping structure of the inline six-cylinder engine of the above aspect, the dynamic damper including the stationary part, the beam part, and the two mass parts which are formed integrally is attached to the cylinder block. The two mass parts are connected to the respective connecting parts of the beam part, and extend in the lateral direction. Thus, also when the crankshaft vibrates in association with the operation of the inline six-cylinder engine in a mode having the amplitudes in the vertical direction and the lateral direction, the vibrational energy is inputted to the dynamic damper via the crank journal part and is absorbed by the dynamic damper. In detail, when the vibrational energy is inputted to the dynamic damper, the beam part deforms in the vertical direction due to the vibration of the two mass parts to absorb the vibrational energy in the vertical direction (cylinder axial direction), while it deforms in the lateral direction to also absorb the vibrational energy in the lateral direction (intake-and-exhaust direction).

Therefore, the damping structure of the inline six-cylinder engine of the above aspect does not only absorb the vibrational energy in the vertical direction like the structure of JP1988-126611U, but also absorbs the vibrational energy in both the vertical direction and the lateral direction. Thus, the damping structure of the inline six-cylinder engine of the above aspect can lower a resonance peak resulting from the vibration of the driven crankshaft more effectively.

In the damping structure of the inline six-cylinder engine of the above aspect, the stationary part may have a pillar shape. The dynamic damper may have a symmetrical shape with respect to a virtual plane, the virtual plane passing through a center axis of the pillar shape and intersecting perpendicularly to the longitudinal direction.

In the damping structure of the inline six-cylinder engine of the above aspect, since the dynamic damper is formed symmetrical with respect to the virtual plane, it can vibrate the beam part and the mass parts in a phase opposite from torsional and bending deflections, and it is effective to lower the resonance peak accompanying the vibration of the crankshaft.

In the damping structure of the inline six-cylinder engine of the above aspect, when the beam part and the two mass parts are seen in a side view from one side in the lateral direction, a thickness of the beam part in the vertical direction may be smaller than a thickness of each of the two mass parts in the vertical direction.

Since in the damping structure of the inline six-cylinder engine of the above aspect the thickness of the beam part of the dynamic damper is smaller than the thickness of the mass parts, it is easy for both the mass parts to deform by using the connecting parts as originating points, when the vibrational energy is inputted from the crankshaft into the dynamic damper via the crank journal part of the cylinder block. Therefore, the damping structure of the inline six-cylinder engine of the above aspect can absorb the vibration of the crankshaft more effectively by the dynamic damper, and it is more effective to lower the resonance peak.

In the damping structure of the inline six-cylinder engine of the above aspect, when the beam part and the two mass parts are seen both in a side view from one side in the lateral direction and a plan view from one side in the vertical direction, the beam part and the two mass parts may form an H-shape as a whole.

Since in the damping structure of the inline six-cylinder engine of the above aspect the dynamic damper is formed to have the H-shape, when the beam part and the mass parts are seen both in the side view and the plan view, it can make the mass parts easier to deform by using the connecting parts as fulcrums, when the vibrational energy is inputted from the crankshaft. Thus, in the damping structure of the inline six-cylinder engine of the above aspect, the dynamic damper can absorb the vibration of the crankshaft more effectively, and it is more effective to lower the resonance peak.

In the damping structure of the inline six-cylinder engine of the above aspect, the dynamic damper may be made of cast iron.

In the damping structure of the inline six-cylinder engine of the above aspect, since the dynamic damper is made of cast iron, it can effectively absorb the vibrational energy with a small occupying volume. This is because a specific gravity of cast iron is about 7.0, and is significantly higher than about 2.7 which is a specific gravity of aluminum alloy used as material to form cylinder blocks. Therefore, the damping structure of the inline six-cylinder engine of the above aspect can absorb the vibration of the crankshaft more effectively by the dynamic damper, while realizing higher space efficiency.

DETAILED DESCRIPTION OF THE DISCLOSURE

Figure 1:
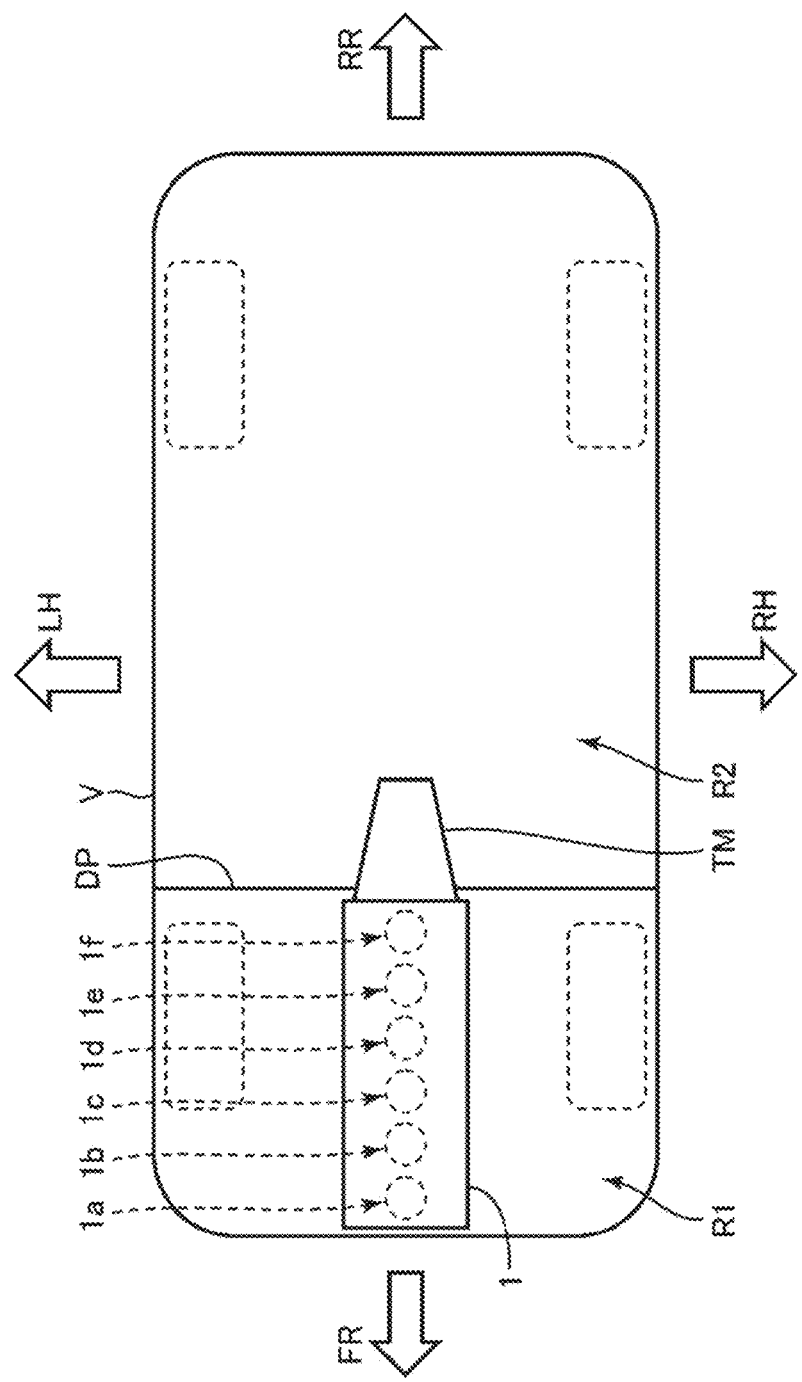
FIG. 1 is a schematic diagram illustrating a vehicle onto which an inline six-cylinder engine according to one embodiment of the present disclosure is mounted.

Hereinafter, one embodiment of the present disclosure is described with reference to the accompanying drawings. Note that the following embodiment exemplarily illustrates the present disclosure, and the present disclosure is not limited to the following embodiment at all, except for its essential configuration.

Further, in the drawings used for the following explanation, "FR" is a front side in the longitudinal direction of the vehicle, "RR" is a rear side in the longitudinal direction of the vehicle, "LH" is a left side in the lateral direction of the vehicle, "RH" is a right side in the lateral direction of the vehicle, "UP" is upward in the vertical direction of the vehicle, and "LO" is a downward in the vertical direction of the vehicle.

1. Configuration of Vehicle V

A configuration of a vehicle V onto which an in-line 6-cylinder reciprocating engine 1 according to this embodiment (hereinafter, simply referred to as "the engine 1") is mounted is described with reference to FIG. 1.

As illustrated in FIG. 1, the vehicle V has an engine bay R1 in a front part, and has a cabin R2 behind the engine bay R1 via a dash panel DP. The engine 1 is longitudinally mounted in the engine bay R1. That is, #1 cylinder 1a to #6 cylinder 1f of the engine 1 are disposed in a line from the front side to the rear side.

A transmission TM is joined to a rear part of the engine 1. The transmission TM is partially inserted into a floor tunnel (not illustrated).

Note that, although detailed illustration is omitted, the cylinder axes of the cylinders 1a-1f of the engine 1 are not oriented in the vertical direction, but they are oriented obliquely in the vertical direction. That is, the engine 1 is a slant engine.

2. Structure of Engine 1

The configuration of the engine 1 according to this embodiment is described with reference to FIGS. 1 and 2. Note that, in FIG. 1, an upper cylinder block, a cylinder head, a cylinder-head cover, and an oil pan of the engine 1 are not illustrated.

As illustrated in FIG. 1, the engine 1 is an in-line 6-cylinder reciprocating engine, where the six cylinders 1a-1f are lined up or disposed in series in the longitudinal direction. Below, the six cylinders 1a-1f are sequentially referred to as #1 cylinder 1a, #2 cylinder 1b, #3 cylinder 1c, #4 cylinder 1d, #5 cylinder 1e, and #6 cylinder 1f from the front side.

The engine 1 is provided with pistons 11-16 which reciprocate the respective cylinders 1a-1f in the vertical direction. Connecting rods 21-26 are coupled to the pistons 11-16, respectively.

The connecting rods 21-26 are pivotally supported by crank pins 43-48 of a crankshaft 30 so that they are pivotable at lower parts thereof. Crank webs 31-42 are disposed forward and rearward of the crank pins 43-48.

The crankshaft 30 is pivotally supported by a combination of crank journal parts 61-67 disposed below the crankshaft 30 and bearing caps 71-77 attached to the respective crank journal parts 61-67.

The crank journal parts 61-67 and the bearing caps 71-77 are disposed on the front side of the #1 cylinder 1a and on the rear side of the #6 cylinder 1f, and between the cylinders 1a-1e. Below, the crank journal parts 61-67 are sequentially referred to as #1 crank journal part 61, #2 crank journal part 62, #3 crank journal part 63, #4 crank journal part 64, #5 crank journal part 65, #6 crank journal part 66, and #7 crank journal part 67 from the front side.

Here, in the engine 1 of this embodiment, the seven crank journal parts 61-67 are integrally formed with a lower cylinder block 60.

A pulley 51 is fixed to a front end of the crankshaft 30, and a flywheel 52 is fixed to a rear end. Note that, since the engine 1 according to this embodiment is longitudinally mounted in the engine bay R1 as described above, the crankshaft 30 is disposed so that the front end side to which the pulley 51 is fixed is oriented to the front side, and the rear end side to which the flywheel 52 is fixed is oriented to the rear side.

Figure 2:
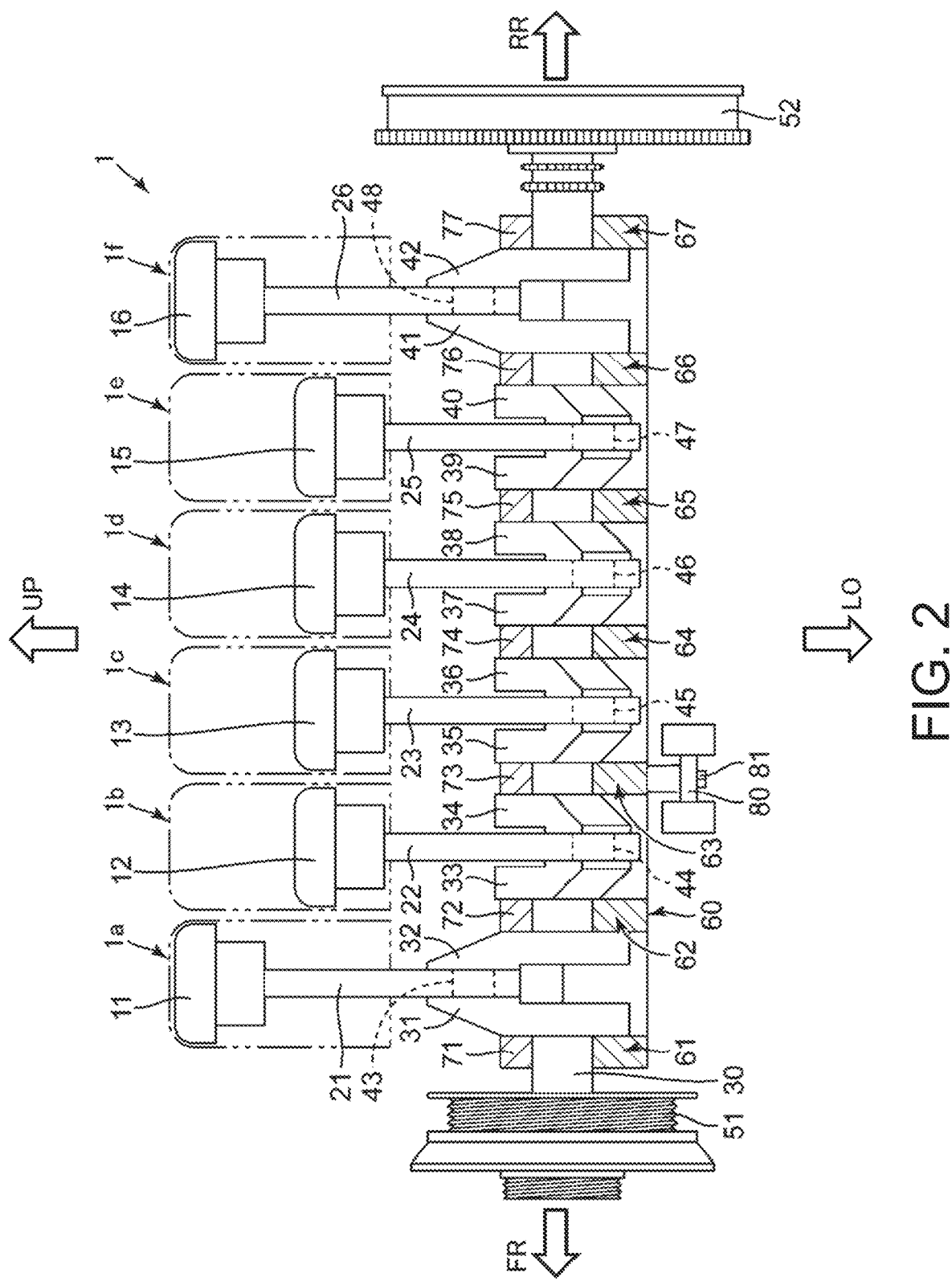
FIG. 2 is a side view illustrating a partial configuration of the engine according to this embodiment.
Figure 3:
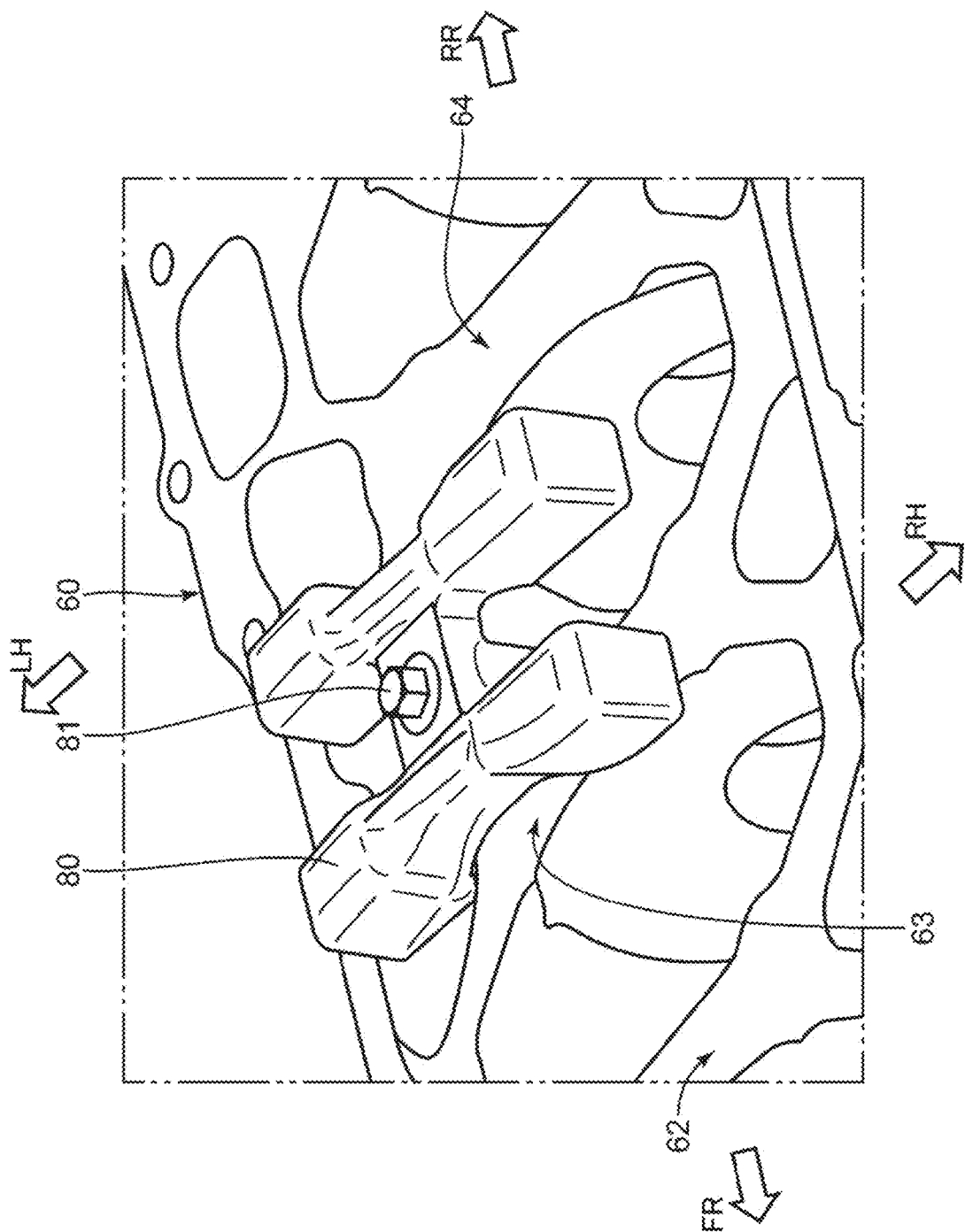
FIG. 3 is a perspective view of the engine, when seen obliquely from below.

As illustrated in FIGS. 1 and 2, a dynamic damper 80 is attached to a lower part of the #3 crank journal part 63 in the lower cylinder block 60. The dynamic damper 80 is attached to the lower cylinder block 60, for example, by fastening with a bolt 81.

Note that, although the center position of the lower cylinder block 60 in the longitudinal direction is a part where the #4 crank journal part 64 is disposed, the dynamic damper 80 is attached to the lower part of the #3 crank journal part 63 on the front side of the #4 crank journal part 64. Note that the attaching position of the dynamic damper 80 to the lower part of the lower cylinder block 60 is not limited to this configuration, as long as the position is between the #2 cylinder 1b and the #4 cylinder 1d. Further, the number of dynamic dampers 80 attached to the lower part of the lower cylinder block 60 is not limited to one, and a plurality of dynamic dampers 80 may be attached.

Here, in this embodiment, the dynamic damper 80 is attached to the lower part of the #3 crank journal part 63 because the flywheel 52 is fixed to the rear end of the crankshaft 30. That is, while the engine 1 operates, the rear end side of the crankshaft 30 to which the flywheel 52 is fixed has smaller amplitude of axial deflection than the front end side (the side to which the pulley 51 is fixed). Conversely, while the engine 1 operates, the part of the crankshaft 30 on the front end side of the center position in the longitudinal direction vibrates with larger amplitude than the part on the rear end side. Therefore, in the engine 1, the dynamic damper 80 is attached below the part of the crankshaft 30 on the front end side which vibrates with larger amplitude while the engine 1 operates. Therefore, the vibration can be effectively suppressed by the dynamic damper 80.

3. Structure of Dynamic Damper 80

The structure of the dynamic damper 80 is described with reference to FIGS. 4 to 6.

Figure 4:
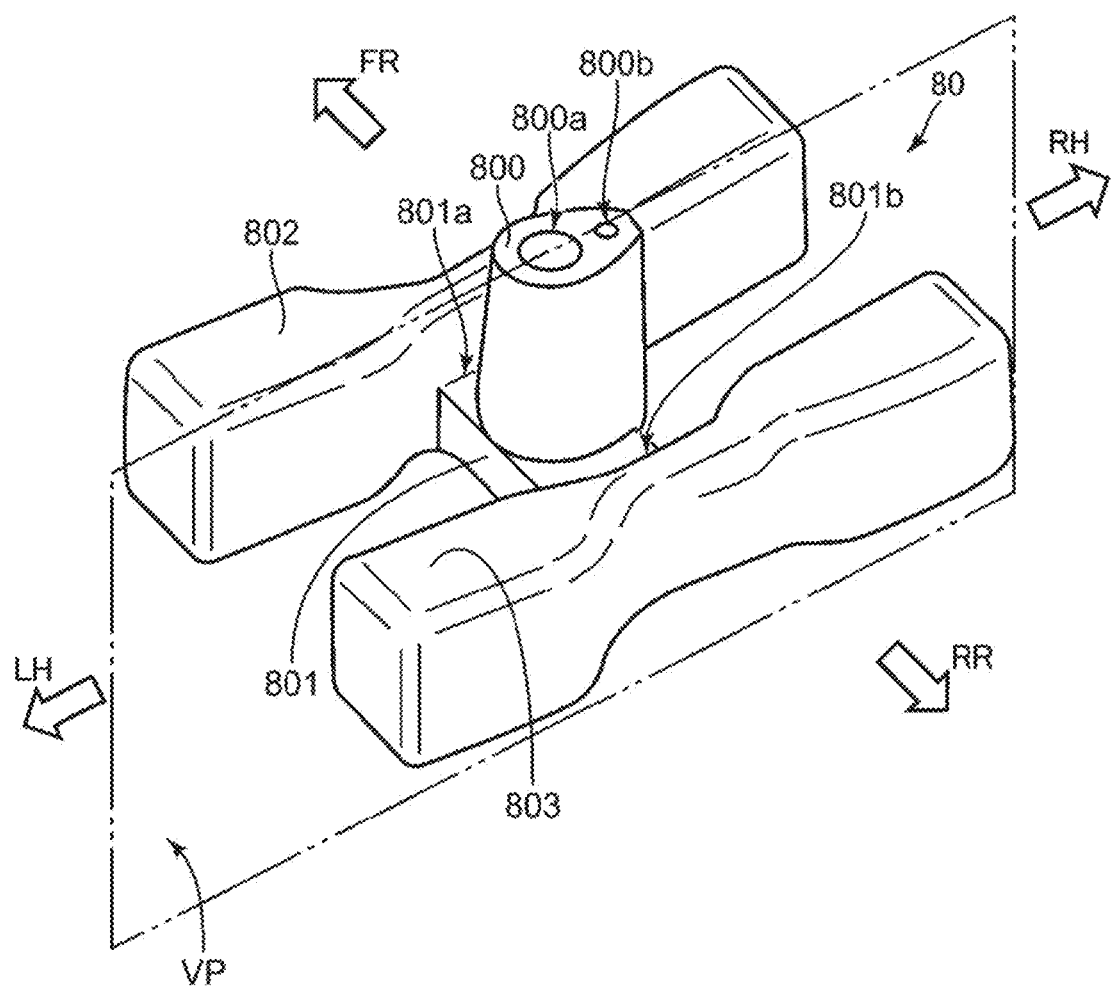
FIG. 4 is a perspective view illustrating a configuration of a dynamic damper fixed to a lower cylinder block.
Figure 5:
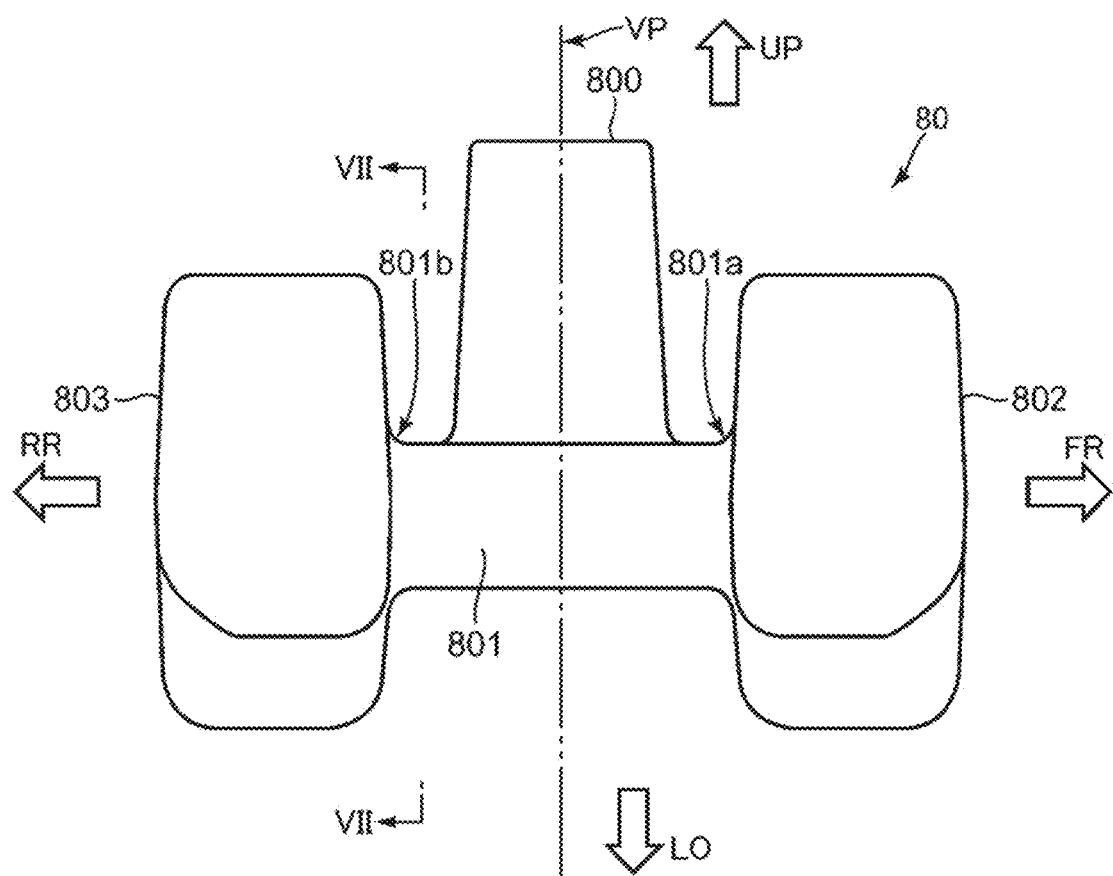
FIG. 5 is a side view of the dynamic damper, when seen from a-Y side.
Figure 6:
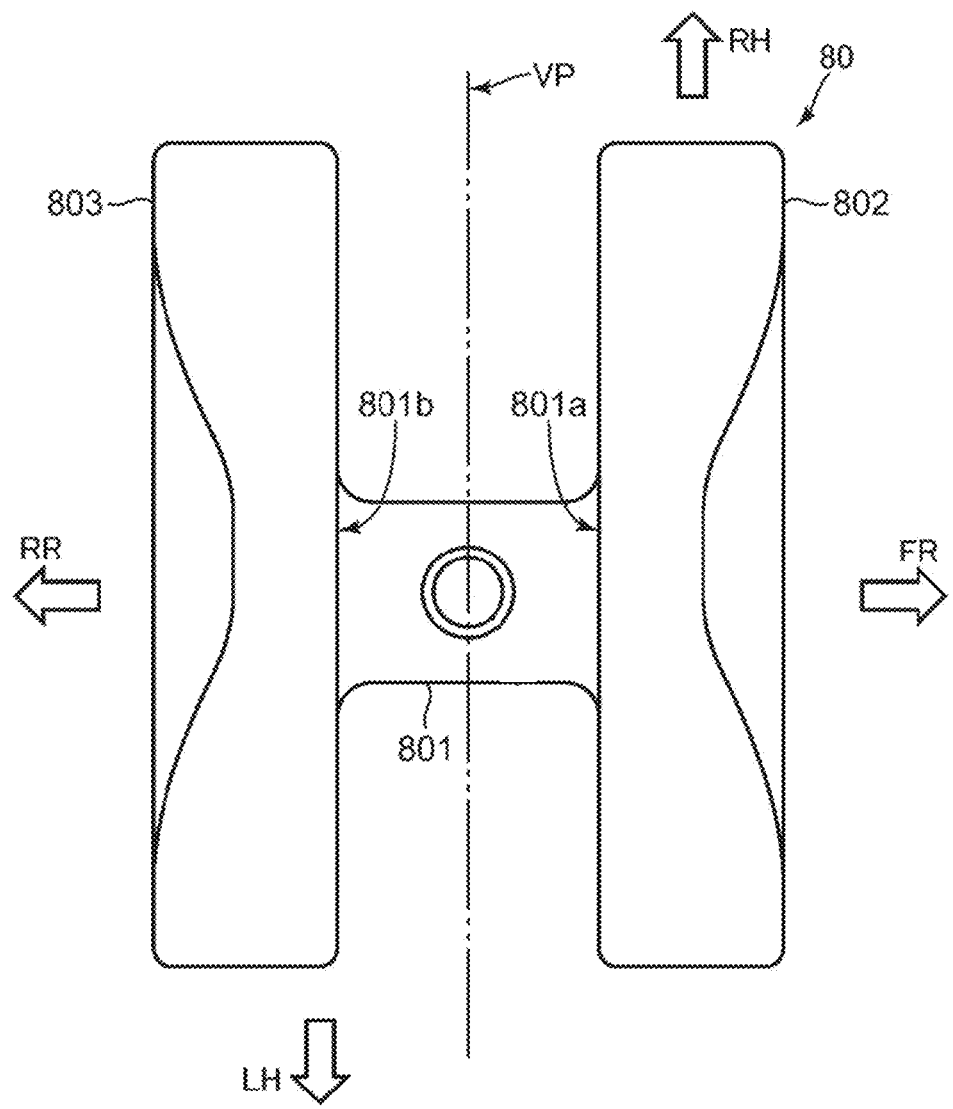
FIG. 6 is a bottom view of the dynamic damper, when seen from a-Z side.

The dynamic damper 80 may be made of cast iron, and as illustrated in FIGS. 4 to 6, it has a stationary part 800, a beam part 801, and two mass parts 802 and 803. The stationary part 800 is attached to the lower part of the #3 crank journal part 63 in the lower cylinder block 60, and it extends in the vertical direction. The stationary part 800 has a pillar shape in which its peripheral surface is comprised of a curved surface. The stationary part 800 includes a through-hole 800a into which a thread part of the bolt 81 (see FIGS. 1 and 2) is insertable, and a pin hole 800b into which a pin for locking rotation of the stationary part 800 to the lower cylinder block 60 is inserted.

The beam part 801 is connected to the bottom of the stationary part 800, and extends in the longitudinal direction. The beam part 801 has a flat-plate shape or a square pillar shape, and it protrudes to both the front side and the rear side of the stationary part 800.

Each of the two mass parts 802 and 803 has a square pillar shape, and extends in the lateral direction. The mass part 802 is connected to the beam part 801 at a connecting part 801a. The mass part 803 is connected to the beam part 801 at a connecting part 801b. That is, the mass parts 802 and 803 are separated from each other in the longitudinal direction by the length of the beam part 801. Note that each of the mass parts 802 and 803 is formed to have substantially the same mass (permitting about 8 g difference) for the parts on the left and right sides of the connecting part 801a or 801b.

Here, as illustrated in FIGS. 4 to 6, a virtual plane VP which passes through the pillar center of the stationary part 800 and intersects perpendicularly to the longitudinal direction is set. In this case, as illustrated in FIGS. 5 and 6, the dynamic damper 80 has a symmetrical shape with respect to the virtual plane VP. As illustrated in FIG. 5, the beam part 801 and the mass parts 802 and 803 are formed to have an H-shape, when seeing the beam part 801 and the mass parts 802 and 803 in a side view from −Y side.

Further, as illustrated in FIG. 6, also when the beam part 801 and the mass parts 802 and 803 are seen in a plan view from below, the beam part 801 has a symmetrical shape in the longitudinal direction with respect to the virtual plane VP, and the mass parts 802 and 803 have a symmetrical shape in the longitudinal direction with respect to the virtual plane VP. As illustrated in FIG. 6, the beam part 801 and the mass parts 802 and 803 are formed to have an H-shape also in the plan view from below.

4. Sizes of Beam Part 801 and Mass Parts 802 and 803

The sizes of the beam part 801 and the mass parts 802 and 803 in the dynamic damper 80 are described with reference to FIG. 7. Note that, although in FIG. 7 only the mass part 803 among the two mass parts 802 and 803 is illustrated, a size relationship of the mass part 802 with respect to the beam part 801 is similar.

Figure 7:
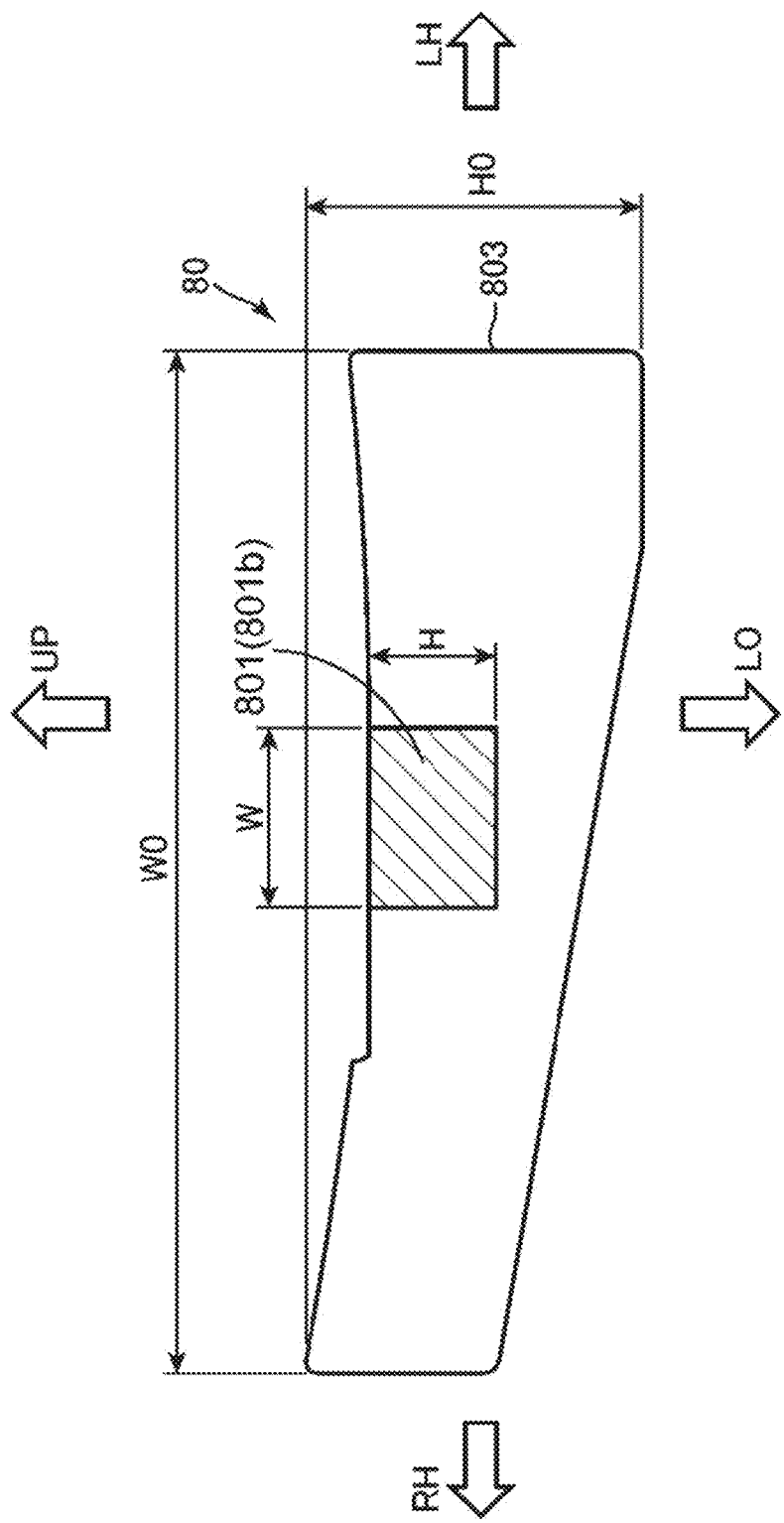
FIG. 7 is a schematic diagram illustrating a relationship in the size between a beam part and a mass part in the dynamic damper.

As illustrated in FIG. 7, the beam part 801 is connected to the mass part 803 at the connecting part 801b. The connecting part 801b is disposed to include the center-of-gravity position of the mass part 802 in the lateral direction. In the beam part 801, the size (width) in the lateral direction is W, and the size (height) in the vertical direction is H.

On the other hand, in the mass part 803, the size in the lateral direction is W0, and the size in the vertical direction is H0. The mass of the mass part 803 is set based on amplitude at a resonance frequency. For example, the mass of the mass part 802 is set within a range of from 250 g to 350 g. In detail, the mass of the mass part 802 is set within a range from 275 g to 300 g.

In the dynamic damper 80, the sizes H and W of the beam part 801 with respect to the sizes H0 and W0 of the mass part 803 are set based on a frequency of a resonance peak to be reduced. For example, a ratio of W/W0 is set within a range from 1/10 to 1/3 (in detail, within a range from 1/5 to 1/4).

Moreover, a ratio of H/H0 is set within a range from 1/5 to 1/2 (in detail, within a range from 1/4 to 2/5).

5. Lower-Surface Shape of Dynamic Damper 80 and Peripheral Members

A relationship between the shape of a lower surface 80a of the dynamic damper 80 and peripheral members is described with reference to FIG. 8. Note that FIG. 8 is a view illustrating the dynamic damper 80 and the peripheral members, when seen from the rear side, and the beam part 801 and the mass part 802 of the dynamic damper 80 are not illustrated.

First, the engine 1 according to this embodiment is longitudinally mounted in the engine bay R1 provided in the front part of the vehicle V. The vehicle V is a four-wheel drive vehicle, which is provided with a front drive shaft 91 extending in the lateral direction inside the engine bay R1. Thus, an oil pan 90 is provided which has a shaft inserting part 90a into which the front drive shaft 91 is inserted. An axial center Ax91 of the front drive shaft 91 which is inserted into the shaft inserting part 90a is oriented in the lateral direction.

Next, the engine 1 inclines so that the intake side (left side) is located upward of the exhaust side (right side). Thus, an upper surface of the oil pan 90 attached to the lower part of the lower cylinder block 60 (see FIG. 1) also inclines (inclined line LN90).

Figure 8:
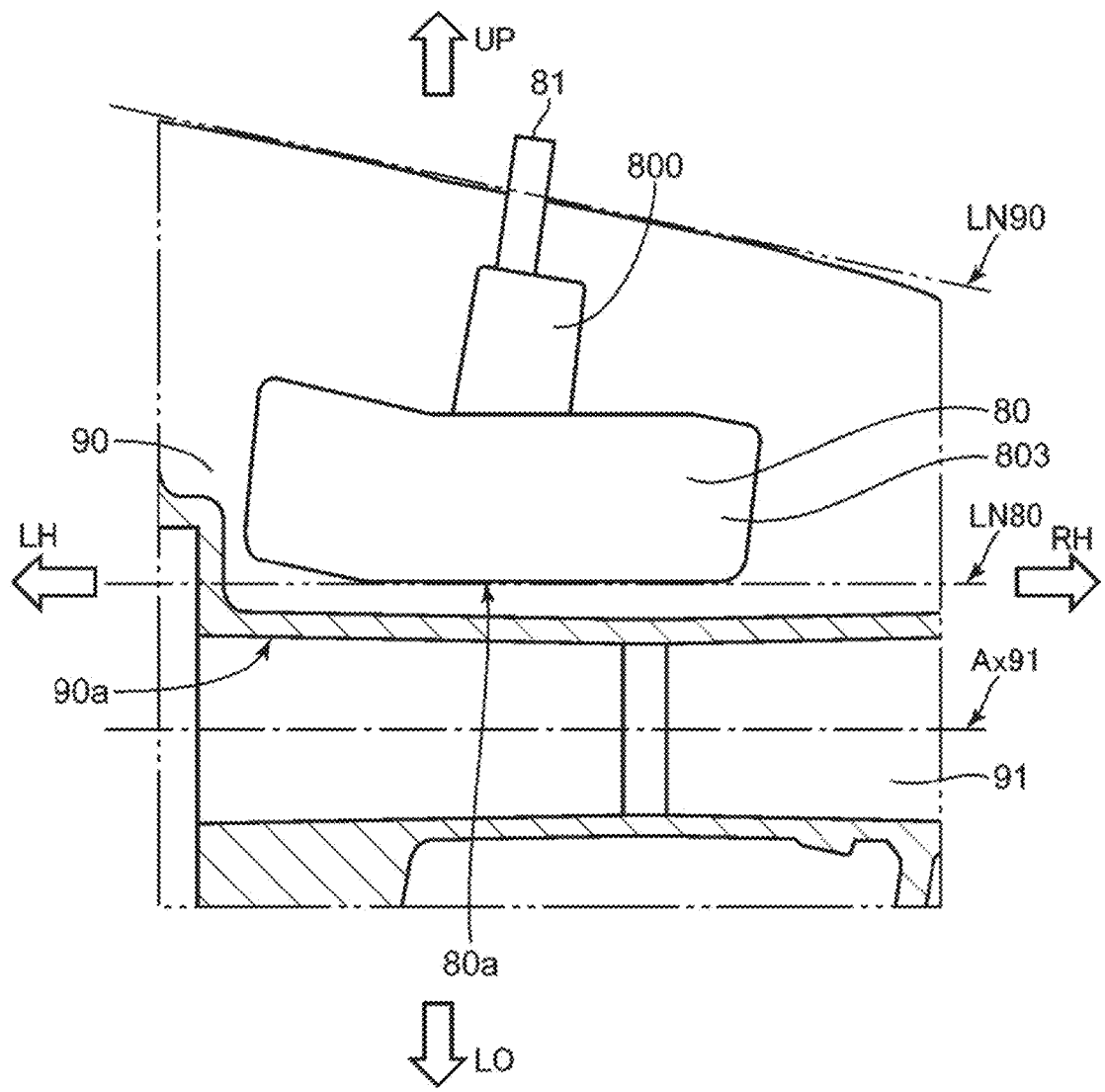
FIG. 8 is a rear view of the dynamic damper, when seen from the rear side.

As illustrated in FIG. 8, the dynamic damper 80 is disposed above the shaft inserting part 90a which is formed in the oil pan 90. Thus, the lower surface 80a of the dynamic damper 80 (i.e., the lower surfaces of the mass parts 802 and 803 in the dynamic damper 80, where the mass part 802 is not illustrated in FIG. 8) is disposed to be substantially parallel to an upper external surface of the shaft inserting part 90a in order to avoid interference with the external surface of the shaft inserting part 90a. Thus, when drawing a virtual line LN80 along the lower surface 80 of the dynamic damper 80, the virtual line LN80 is disposed to be substantially parallel to the axial center Ax91 of the front drive shaft 91, and in a direction which intersects with the inclined line LN90 by an acute angle.

6. Control According to Operating State of Engine 1

A control according to the operating state of the engine 1 is described with reference to FIG. 9.

The engine 1 according to this embodiment is drive-controlled by a PCM (Power Control Module). The PCM has a microprocessor which executes operation processing, and a memory in which a map for every operating range is stored in advance. FIG. 9 is a view illustrating an operation map for explaining a difference in a combustion control according to an engine speed and a load of the engine 1.

Figure 9:
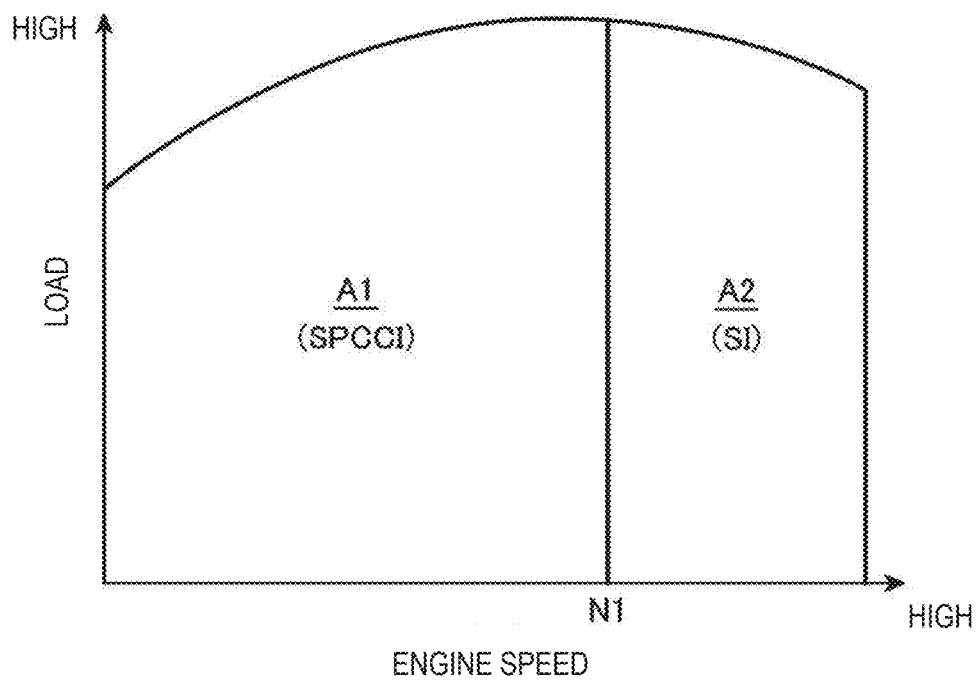
FIG. 9 is a diagram illustrating an operation map in which an operating range of the engine according to this embodiment is classified based on a difference in a combustion mode.

As illustrated in FIG. 9, the operating range of the engine 1 is roughly divided into two operating ranges A1 and A2 by a difference in a combustion mode. Here, when the two operating ranges are a first operating range A1 and a second operating range A2, the second operating range A2 is a high-speed range where the engine speed exceeds a first engine speed N1, and the first operating range A1 is a low-and-middle speed range where the engine speed is the first engine speed N1 or lower. The outline of the combustion control in each of the operating ranges A1 and A2 is as follows.

(1) First Operating Range A1

In the first operating range A1 (low-and-middle speed range) where the engine speed is the first engine speed N1 or lower, SPCCI (Spark Controlled Compression Ignition) combustion which is a combination of SI (Spark Ignition) combustion and CI (Compression Ignition) combustion is performed.

SI combustion is a combustion mode in which mixture gas is ignited by sparks generated by a spark plug, and the mixture gas is forcibly combusted by flame propagation which expands its combustion range from the ignition point to the circumference.

CI combustion is a combustion mode in which mixture gas is combusted by self-ignition under an environment where the mixture gas is fully raised in the temperature and pressure by compression of the pistons 11-16.

SPCCI combustion in which SI combustion and CI combustion are combined is a combustion mode in which a part of mixture gas inside the combustion chamber is SI-combusted by jump-spark ignition performed under an environment just before the mixture gas carries out the self-ignition, and the remaining mixture gas inside the combustion chamber is combusted by the self-ignition (CI combustion) after SI combustion (by further increases in the temperature and pressure accompanying SI combustion).

In SPCCI combustion, the heat release by SI combustion and the heat release by CI combustion sequentially occur in this order. At this time, the rise of the heat release of CI combustion becomes steeper than SI combustion because of the nature that CI combustion is faster in the combustion speed. Thus, a waveform of a rate of heat release in SPCCI combustion has a point of inflection which appears at a timing of changing from SI combustion to CI combustion.

Here, a crank angle corresponding to the point of inflection which appears at the timing of changing from SI combustion to CI combustion is used as a start time of CI combustion. While the engine 1 operates in the first operating range A1, the PCM which executes the drive control of the engine 1 controls an injection amount and an injection timing of fuel by an injector, and an ignition timing by the spark plug so that the start time of this CI combustion becomes a suitable timing in consideration of thermal efficiency etc., and an output of the engine 1 becomes a required value.

(2) Second Operating Range A2

In the second operating range A2 (high-speed range) where the engine speed is higher than the first engine speed N1, a control in which mixture gas is combusted by SI combustion is executed. For example, the PCM controls the injector so that a necessary amount of fuel is injected mainly in intake stroke, and causes the spark plug to perform jump-spark ignition near a compression top dead center. Then, SI combustion is started, triggered by the jump-spark ignition, and all the mixture gas inside the combustion chamber combusts by flame propagation.

7. Contribution of Each of Cylinders 1a-1f to Noise in Cabin

Figure 10:
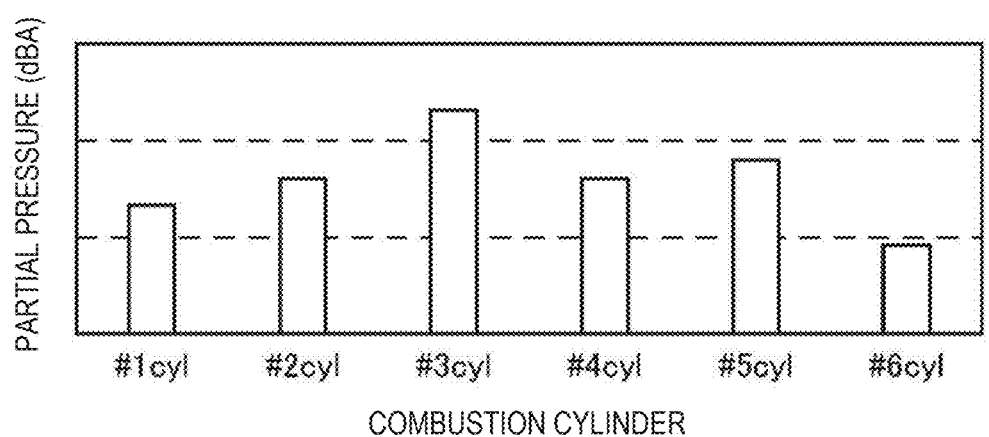
FIG. 10 is a graph illustrating a contribution related to vibration per combustion cylinder.

Contribution of each of the cylinders 1*a*-1*f* to noise which is radiated from the engine 1 and propagates into the vehicle cabin is described with reference to FIG. 10. FIG. 10 is a graph illustrating a partial pressure of each of the cylinders 1*a*-1*f* of the engine 1.

As illustrated in FIG. 10, the #6 cylinder 1*f* had the lowest measured partial pressure among the six cylinders 1*a*-1*f*. This may be because the flywheel 52 is fixed to the rear end of the crankshaft 30 extending in the longitudinal direction, and the vibration in the part of the crankshaft 30 on the rear end side is suppressed. Each of the partial pressures of the #1-#5 cylinders 1*a*-1*e* is described on the basis of the partial pressure of the #6 cylinder 1*f*.

The measured partial pressure in the #1 cylinder 1*a* was about 40% higher than the partial pressure in the #6 cylinder 1*f*. Similarly, the measured partial pressure in the #2 cylinder 1*b* was about 67% higher, the measured partial pressure in the #3 cylinder 1*c* was about 140% higher, the measured partial pressure in the #4 cylinder 1*d* was about 67% higher, and the measured partial pressure in the #5 cylinder 1*e* was about 87% higher, than the partial pressure in the #6 cylinder 1*f*.

As described above, in the inline six-cylinder engine 1, it turns out that the contribution of the #3 cylinder 1*c* at a position offset to the front side of the center position of the cylinders 1*a*-1*f* in the longitudinal direction (cylinder lined-up direction) is higher. Therefore, in this embodiment, as described above, the dynamic damper 80 is attached to the lower part of the #3 crank journal part 63 which is located at the position offset to the front side (to the side in which the pulley 51 is fixed to the crankshaft 30) from the center position of the lower cylinder block 60 in the longitudinal direction.

8. Vibration Mode of Dynamic Damper 80 while Engine 1 Operates

Figure 11A:
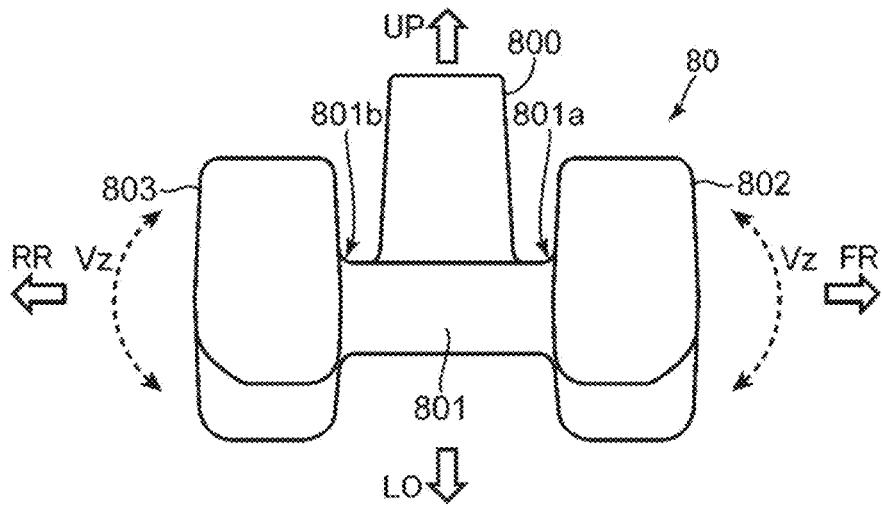
FIG. 11A is a schematic diagram illustrating a vibration mode in a cylinder axial direction.

A vibration mode of the dynamic damper 80 while the engine 1 operates is described with reference to FIGS. 11A and 11B. FIG. 11A is a view illustrating the vibration mode in the vertical direction (cylinder axial direction), and FIG. 11B is a view illustrating the vibration mode in the lateral direction (intake-and-exhaust direction).

As illustrated in FIG. 11A, when vibrational energy is inputted from the crankshaft 30 into the dynamic damper 80 via the lower cylinder block 60 in association with the operation of the engine 1, the mass parts 802 and 803 vibrate in the vertical direction as illustrated by broken line arrows Vz. Therefore, the beam part 801 vibrates in the vertical direction (cylinder axial direction) mode.

Figure 11B:
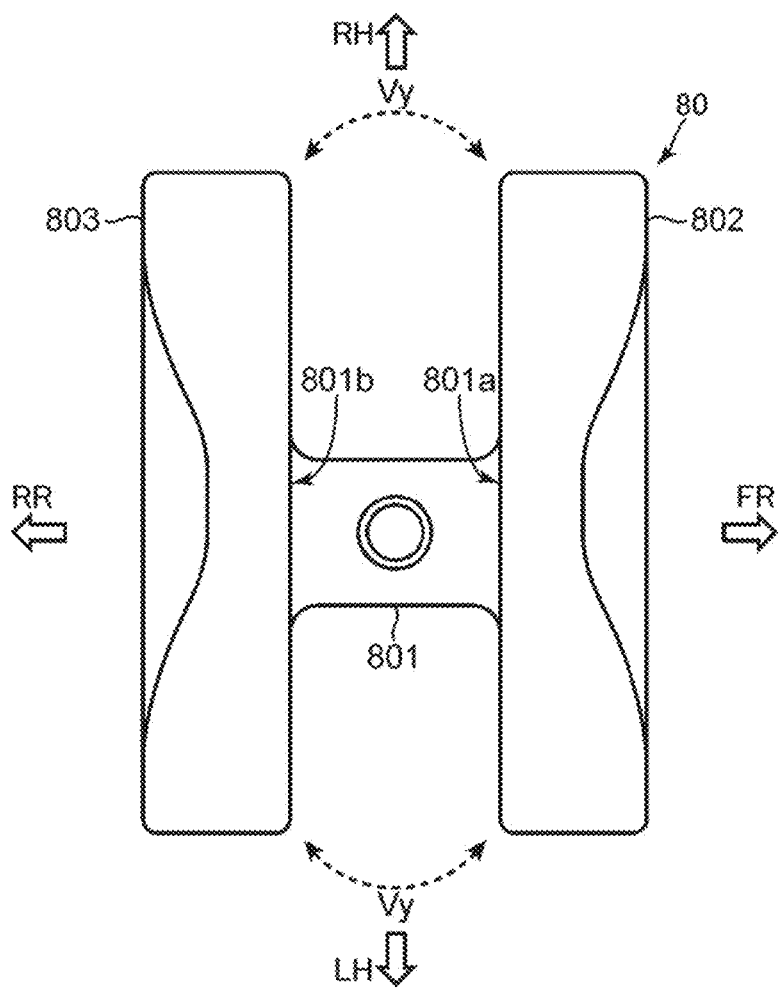
FIG. 11B illustrates a vibration mode in an intake-and-exhaust direction.

Further, as illustrated in FIG. 11B, when the vibrational energy is inputted from the crankshaft 30, the mass parts 802 and 803 vibrate so that their end parts approach each other and separate from each other, as illustrated by broken line arrows Vy. Therefore, the beam part 801 vibrates in the lateral direction (intake-and-exhaust direction) mode.

9. Reduction of Engine Radiation Sound for Every Frequency

Figure 12:
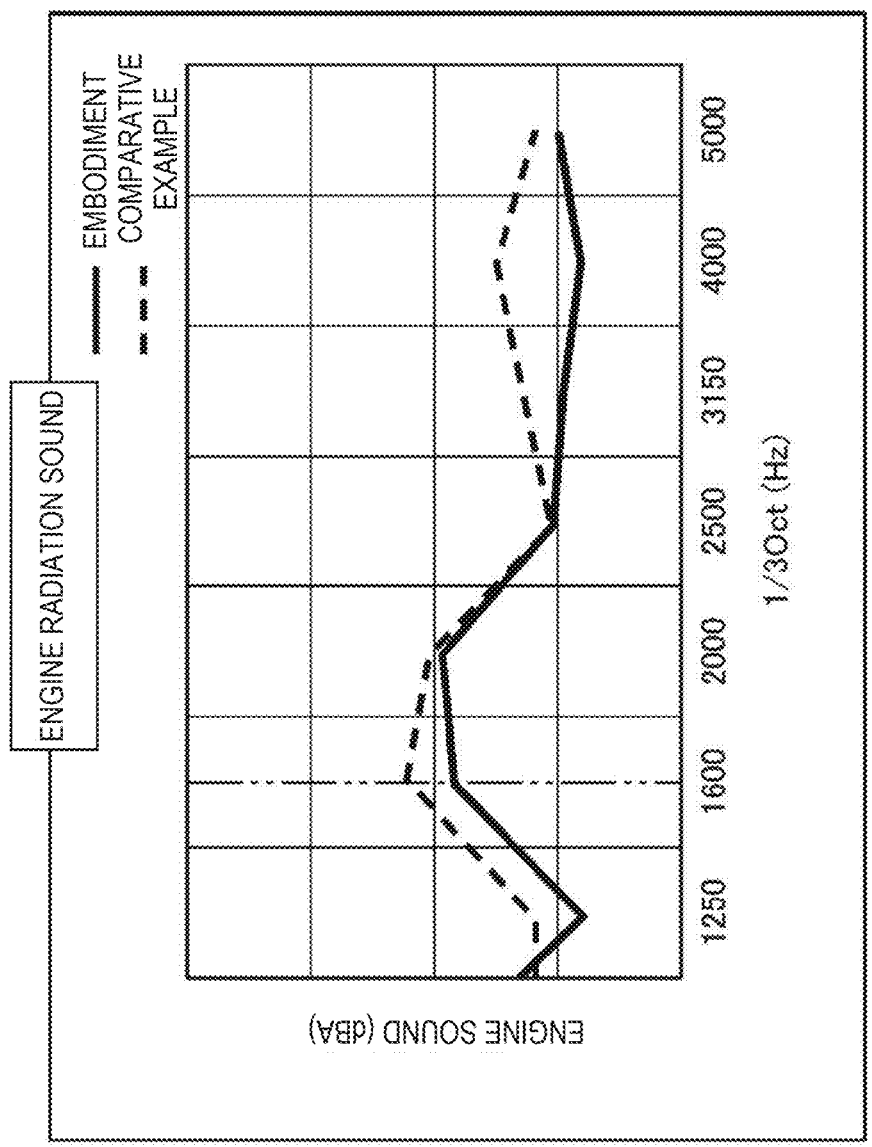
FIG. 12 is a graph illustrating an engine radiation sound for every frequency.

Effects of attaching the dynamic damper 80 having the above structures to the lower part of the #3 crank journal part 63 (i.e., the reduction of the engine radiation sound) are described for every frequency with reference to FIG. 12. Note that, in the graph of FIG. 12, the engine radiation sound in the engine 1 with the structure of this embodiment is illustrated by a solid line, and the engine radiation sound in an engine with a structure in which the dynamic damper 80 is not attached to the engine 1 is illustrated by a broken line.

As illustrated in FIG. 12, in the case of a comparative example illustrated by the broken line, the largest resonance peak was measured near a frequency of 1,600 Hz. Further, in the case of the comparative example, the resonance peak was also measured near 4,000 Hz.

On the other hand, in the case of this embodiment, a component of the engine radiation sound near 1,600 Hz became about 2 dBA lower than the comparative example. Further, a component near 4,000 Hz became about 3 dBA lower than the comparative example, and a peak did not appear.

10. ERPs in #3 and #4 Crank Journal Parts 63 and 64

Figure 13A:
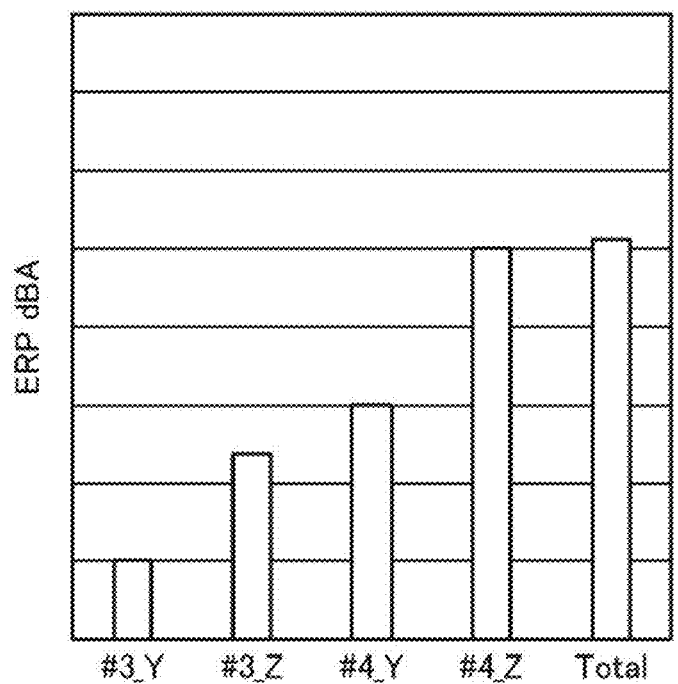
FIG. 13A is a graph illustrating an equivalent acoustic radiation power in #3 and #4 cylinders of the engine according to this embodiment which is provided with the dynamic damper.

ERPs (Equivalent Radiated Powers) at 1,600 Hz of the #3 and #4 crank journal parts 63 and 64 in this embodiment in which the dynamic damper 80 having the above structure is attached to the lower part of the #3 crank journal part 63, and in the comparative example in which the dynamic damper 80 is not attached are described with reference to FIGS. 13A and 13B. FIG. 13A illustrates the ERP of this embodiment and FIG. 13B illustrates the ERP of the comparative example.

Figure 13B:
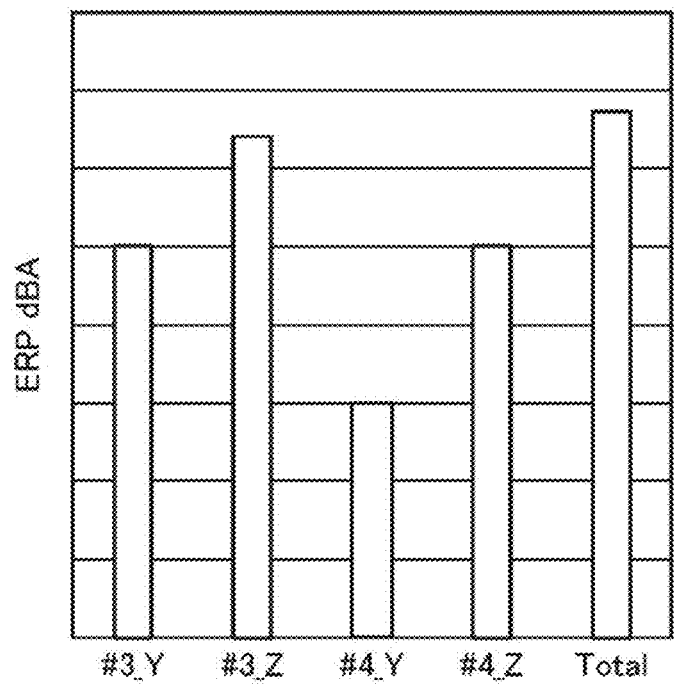
FIG. 13B is a graph illustrating an equivalent acoustic radiation power in #3 and #4 cylinders of an engine according to a comparative example which is not provided with a dynamic damper.

As illustrated in FIG. 13B, in the comparative example in which the dynamic damper 80 of the above structure is not attached to the lower part of the #3 crank journal part 63, the ERP of the #3 crank journal part 63 in the lateral direction (#3_Y) was 55 dBA, the ERP in the vertical direction (#3_Z) was 62 dBA, and the sum total of the #3 and #4 crank journal parts 63 and 64 was 63.5 dBA. #4 Y refers to the ERPs in the lateral direction of the #4 crank journal part 64, and #4 Z refers to the ERPs in the vertical direction of the #4 crank journal part 64.

On the other hand, as illustrated in FIG. 13A, in this embodiment in which the dynamic damper 80 of the above structure is attached to the lower part of the #3 crank journal part 63, the ERP of the #3 crank journal part 63 in the lateral direction (#3_Y) was 35 dBA, the ERP in the vertical direction (#3_Z) was 42 dBA, and the sum total of the #3 and #4 crank journal parts 63 and 64 was 55.6 dBA. Comparing FIG. 13A with FIG. 13B, in this embodiment in which the dynamic damper 80 is attached to the lower part of the #3 crank journal part 63, the ERPs of the #3 crank journal part 63 in the lateral direction and the vertical direction were reduced significantly than in the comparative example. In detail, in this embodiment, the reduction of 20 dBA was observed in both the lateral direction and the vertical direction, as compared with the comparative example.

11. Effects

In the engine 1 according to this embodiment, as described with reference to FIG. 9, SPCCI combustion is performed in the first operating range A1 (low-and-middle speed range) where the engine speed of the engine 1 is the first engine speed N1 or lower. As a result of the present inventors' diligent examination, they reached a conclusion that knock sound propagation from the engine 1 into the vehicle cabin via the transmission becomes a problem in association with the execution of SPCCI combustion. In order to suppress this knock sound propagation, the engine 1 according to this embodiment adopts the above damping structure.

The damping structure of the engine 1 according to this embodiment has the configuration in which the dynamic damper 80 is attached to the lower part of the lower cylinder block 60 (in detail, at at least one location between adjacent cylinders among the #2-#4 cylinders 1b-1d). In detail, the dynamic damper 80 is attached to the lower part of the #3 crank journal part 63 in the lower cylinder block 60. The dynamic damper 80 is attached to the lower part of the lower cylinder block 60 at the position between the #2-#4 cylinders 1b-1d on the front side of the center position in the longitudinal direction (in this embodiment, the lower part of the #3 crank journal part 63), because the flywheel 52 is fixed to the rear end of the crankshaft 30 and the front end side vibrates with larger amplitude than the rear end side as described above.

Therefore, in the damping structure of the engine 1, by attaching the dynamic damper to the lower part of the lower cylinder block 60 at at least one location between the adjacent cylinders among the #2-#4 cylinders in the longitudinal direction, vibrational energy can be absorbed effectively in the part where the amplitude is large due to deformation of the dynamic damper 80.

Further, in the damping structure of the engine 1 according to this embodiment, the dynamic damper 80 integrally having the stationary part 800, the beam part 801, and the two mass parts 802 and 803 is attached to the lower part of the lower cylinder block 60. The two mass parts 802 and 803 are formed so that they are connected to the connecting parts 801a and 801b of the beam part 801, respectively, and extend in the lateral direction. Thus, also when the crankshaft 30 vibrates in association with the operation of the engine 1 in the mode having the amplitudes in the vertical direction and the lateral direction, the vibrational energy is inputted to the dynamic damper 80 via the #3 crank journal part 63 and is absorbed by the dynamic damper 80. In detail, when the vibrational energy is inputted to the dynamic damper 80, the beam part 801 deforms in the vertical direction due to the vibration of the two mass parts 802 and 803 to absorb the vibrational energy in the vertical direction (cylinder axial direction), while it deforms in the lateral direction to also absorb the vibrational energy in the lateral direction (intake-and-exhaust direction).

Therefore, the damping structure of the engine 1 does not only absorb the vibrational energy in the vertical direction like the structure of JP1988-126611U, but also absorbs the vibrational energy in both the vertical direction and the lateral direction. Thus, the damping structure of the engine 1 can lower the resonance peak resulting from the vibration of the driven crankshaft 30 more effectively.

Further, since the damping structure of the engine 1 according to this embodiment is configured so that the dynamic damper 80 is formed symmetrical with respect to the virtual plane VP illustrated in FIGS. 4 to 6, it can vibrate the beam part 801 and the mass parts 802 and 803 in the phase opposite from torsional and bending deflections, and it is effective to lower the resonance peak accompanying the vibration of the crankshaft 30.

Since in the damping structure of the engine 1 according to this embodiment the thickness H of the beam part 801 of the dynamic damper 80 in the vertical direction is smaller than the thickness H0 of the mass parts 802 and 803, it is easy for both the mass parts 802 and 803 to deform by using the connecting parts 801a and 801b as originating points, when the vibrational energy is inputted from the crankshaft 30 into the dynamic damper 80 via the #3 crank journal part 63 of the lower cylinder block 60. Therefore, the damping structure of the engine 1 can absorb the vibration of the crankshaft 30 more effectively by the dynamic damper 80, and it is more effective to lower the resonance peak.

Further, since in the damping structure of the engine 1 according to this embodiment the dynamic damper 80 has the H-shape, when the beam part 801 and the mass parts 802 and 803 are seen both in the side view and the plan view as illustrated in FIGS. 5 and 7, it can make the mass parts 802 and 803 easier to deform by using the connecting parts 801a and 801b as fulcrums, when the vibrational energy is inputted from the crankshaft 30. Thus, in the damping structure of the engine 1, the dynamic damper 80 can absorb the vibration of the crankshaft 30 more effectively, and it is more effective to lower the resonance peak.

Further, since in the damping structure of the engine 1 according to this embodiment the dynamic damper 80 is made of cast iron, it can effectively absorb the vibrational energy with a small occupying volume. This is because a specific gravity of cast iron is about 7.0, and is significantly higher than about 2.7 which is a specific gravity of aluminum alloy used as material to form the lower cylinder block 60, as described above. Therefore, the damping structure of the engine 1 can absorb the vibration of the crankshaft 30 more effectively by the dynamic damper, while realizing higher space efficiency.

As described above, the damping structure of the engine 1 according to this embodiment can effectively attenuate the vibration of the 6-cylinder reciprocating engine.

Modifications

A damping structure of an in-line 6-cylinder reciprocating engine according to a modification (hereinafter, simply referred to as "the engine") is described with reference to FIGS. 14 and 15. Note that the inline six-cylinder engine according to this modification differs from the above embodiment only in the configuration of a dynamic damper 82, and other configurations are the same as those of the above embodiment. Thus, below, the explanation of the same configurations as the above embodiment is omitted.

In the engine according to this modification, the dynamic damper 82 is attached to the lower part of the lower cylinder block 60 (see FIG. 2 etc.) (in detail, at at least one location between adjacent cylinders among the #2-#4 cylinders 1b-1d). The dynamic damper 82 is attached to the lower cylinder block 60 by fastening the bolt 81 like in the above embodiment.

Figure 14:
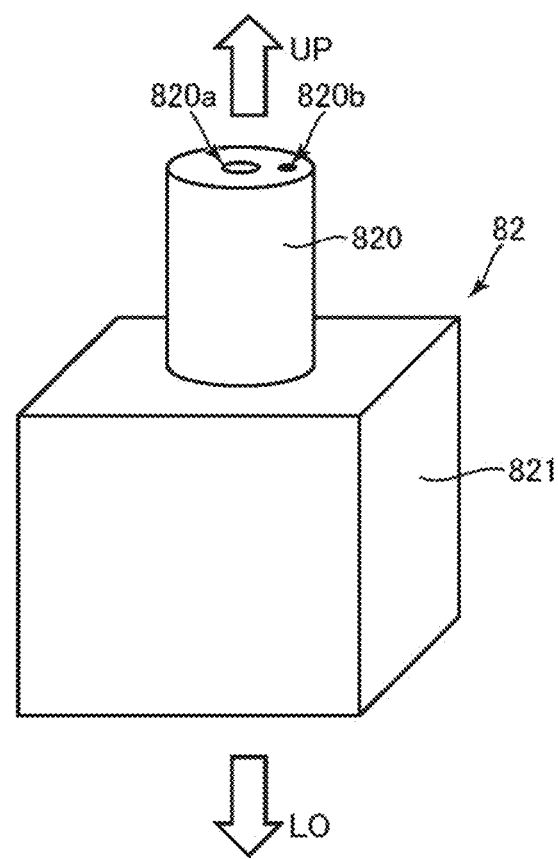
FIG. 14 is a perspective view illustrating a configuration of a dynamic damper provided to an inline six-cylinder engine according to a modification.

As illustrated in FIG. 14, the dynamic damper 82 has a stationary part 820 and one mass part 821. The stationary part 810 is attached to the lower part of the lower cylinder block 60, and it extends in the vertical direction. The stationary part 820 has a pillar shape in which the peripheral surface is comprised of a curved surface like in the above embodiment. The stationary part 820 has a through-hole 820a into which the thread part of the bolt 81 (see FIGS. 1 and 2) is insertable, and a pin hole 820b which accepts insertion of a pin for locking rotation of the stationary part 820 with respect to the lower cylinder block 60.

The mass part 821 is connected to the lower cylinder block 60 so that it is suspended downwardly from the stationary part 820. The mass part 821 has a square pillar shape, and it protrudes from the stationary part 820 in a direction perpendicular to the vertical direction. Note that the shape of mass part 821 is not limited to the shape illustrated in FIG. 14, but it may be a pillar shape and a spherical shape.

Next, ERPs at 1,600 Hz in the crank journal parts 63 and 64 when the dynamic damper 82 of this modification is attached to the lower part of the #3 crank journal part 63, and when the dynamic damper 82 is attached to both the lower parts of the #3 crank journal part 63 and the #4 crank journal part 64, are described with reference to FIGS. 15A and 15B. Note that, in FIGS. 15A and 15B, a broken line indicates a value of ERP in FIG. 13B (ERP in the comparative example).

Figure 15A:
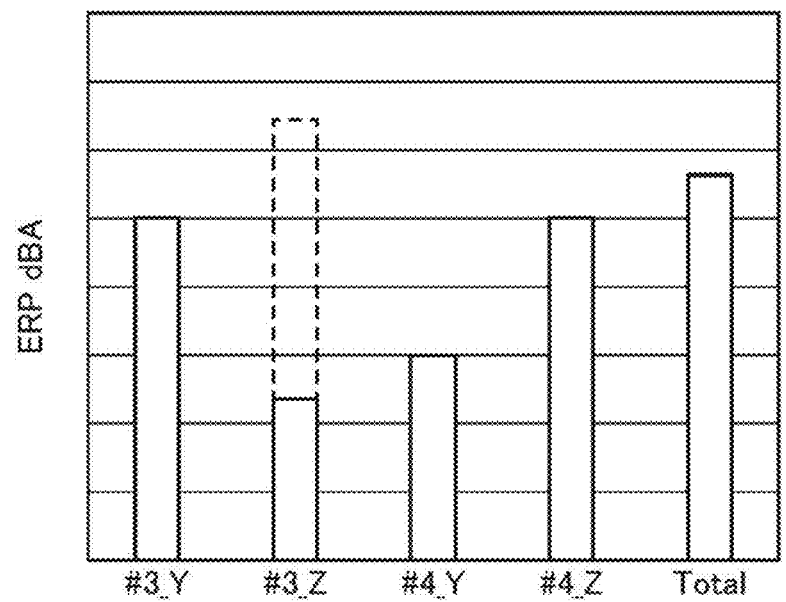
FIG. 15A is a graph illustrating an equivalent acoustic radiation power when the dynamic damper of this modification is attached to a #3 crank journal part.

As illustrated in FIG. 15A, in the embodiment in which the dynamic damper 82 is attached to the lower part of the #3 crank journal part 63, the ERP in the vertical direction of the #3 crank journal part 63 (#3_Z) was 42 dBA, and the sum total of the #3 and #4 crank journal parts 63 and 64 was 58.3 dBA. In this embodiment in which the dynamic damper 82 is attached to the lower part of the #3 crank journal part 63, the ERP in the vertical direction of the #3 crank journal part 63 was reduced significantly as compared with the comparative example of FIG. 13B. In detail, in this embodiment, the reduction by 20 dBA in the vertical direction was observed as compared with the comparative example.

Figure 15B:
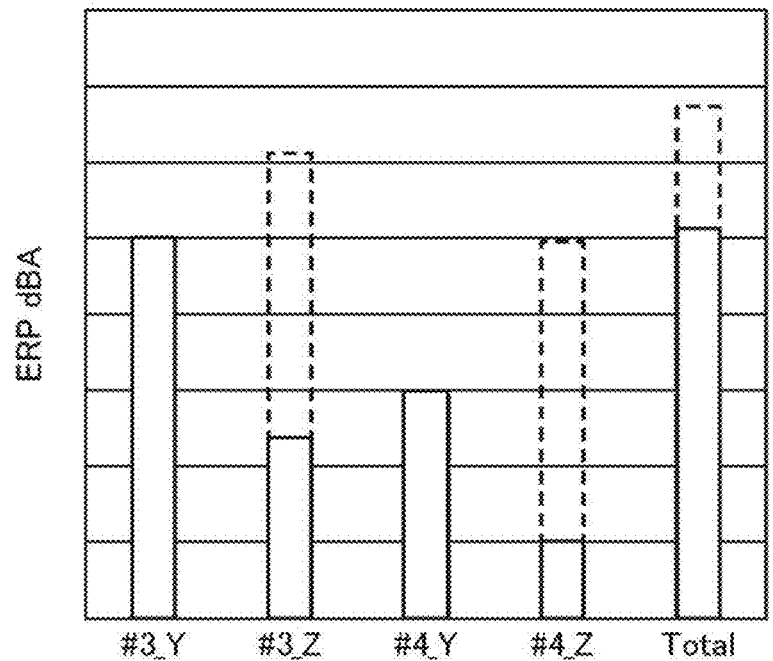
FIG. 15B is a graph illustrating an equivalent acoustic radiation power when the dynamic damper of this modification is attached to the #3 and #4 crank journal parts.

Next, as illustrated in FIG. 15B, in the embodiment in which the dynamic damper 82 is attached to the lower part of the #3 crank journal part 63, the ERPs in the vertical direction of the #3 crank journal part 63 and #4 crank journal part 64 (#3_Z, #4_Z) were 42 dBA and 35 dBA, respectively, and the sum total of the #3 and #4 crank journal parts 63 and 64 was 55.6 dBA. In the embodiment in which the dynamic damper 82 is attached to the lower part of the #3 crank journal part 63 and the lower part of the #4 crank journal part 64, the ERPs in the vertical direction of the #3 crank journal part 63 and #4 crank journal part 64 were reduced significantly as compared with the comparative example of FIG. 13B. In detail, in this embodiment, the reduction by 20 dBA was observed in the #3 crank journal part 63 and the #4 crank journal part 64 as compared with the comparative example.

As described above, also in the damping structure of the engine according to this modification, it is possible to attenuate the vibration in the vertical direction, even when the dynamic damper 82 having the structure illustrated in FIG. 14 is attached to the lower part of the lower cylinder block 60 (in detail, at at least one location between adjacent cylinders among the #2-#4 cylinders 1b-1d). That is, the crankshaft 30 vibrates with larger amplitude in the part on the front end side of the center position in the longitudinal direction, which originates in that that the flywheel 52 is fixed to the rear end of the crankshaft 30. Thus, by attaching the dynamic damper 82 to the lower part of the lower cylinder block 60 between the #2-#4 cylinders 1b-1d, the dynamic damper 82 can effectively absorb the vibration occurring in the crankshaft 30, and can suppress the propagation of the sound into the vehicle cabin.

Note that, although detailed explanation is omitted, the stationary part 820 and the mass part 821 are integrally formed by being made of cast iron also in the dynamic damper 82 of this modification. Effects by this configuration are the same as the above embodiment.

Other Modifications

Although in the above embodiment the adoptable ranges of H/H0 and W/W0 in the dynamic damper 80 are described, the ranges may be changed according to the resonance peak frequency of the vibration which is produced by the rotation of the engine crankshaft. Further, the mass of the mass part may also be changed according to the frequency at which the vibration energy is to be absorbed by the dynamic damper.

Further, although in the above embodiment the dynamic damper 80 having the two mass parts 802 and 803 is adopted, three or more mass parts may be connected to the beam part in the present disclosure.

Further, although in the above embodiment only one dynamic damper 80 is attached to the lower part of the #3 crank journal part 63 in the lower cylinder block 60, and in the above modification the dynamic damper 82 is attached to the lower parts of the #3 crank journal part 63 and the #4 crank journal part 64, one or more dynamic damper(s) 80 and/or 82 may be attached to the lower part(s) of the cylinder block between the #2-#4 cylinders 1b-1d in the present disclosure.

Further, the position at which the dynamic damper 80 and/or 82 is attached may not include the #3 crank journal part 63. That is, according to the engine characteristics, the part where the amplitude of the vibration becomes the largest, and by attaching the dynamic damper having the configuration similar to the above to this part, the high vibration suppression capability can be secured.

Further, although in the above embodiment and the above modification the lower cylinder block 60 has the structure with a bottom wall, in which the parts between the crank journal parts 61-67 are opened, the present disclosure is not limited to this configuration. It is also possible to adopt a lower cylinder block having a bottom wall which is closed at the crank journal parts. In this case, it is not necessary to attach the dynamic damper to the lower part of the crank journal parts 63 and 64, but it is possible to attach the dynamic damper to a part offset in the longitudinal direction from the crank journal parts 63 and 64, as long a the position is in a lower part of the cylinder block at a location between the #2-#4 cylinders 1b-1d.

Further, although in the above embodiment the dynamic dampers 80 and 82 are integrally formed by being made of cast iron, it is not necessary to adopt the cast iron as the constituent material of the dynamic damper in the present disclosure. By forming the dynamic damper using material having a high specific gravity compared with the constituent material of the lower cylinder block, it can exert similar effects to the above configuration. Further, the dynamic damper is not necessary to have the integral structure, but it is also possible to adopt a dynamic damper comprised of a combination of a plurality of members.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

| | |
|---|---|
| 1 | Engine |
| 1a-1f | Cylinder |
| 30 | Crankshaft |
| 51 | Pulley |
| 52 | Flywheel |
| 60 | Lower Cylinder Block |
| 61-67 | Crank Journal Part |
| 80, 82 | Dynamic Damper |
| 81 | Bolt |
| 800, 820 | Stationary Part |
| 801 | Beam Part |
| 801a, 801b | Connecting Part |
| 802, 803, 821 | Mass Part |
| V | Vehicle |
| R1 | Engine Bay |
| TM | Transmission |

What is claimed is:

1. A damping structure of an inline six-cylinder engine provided with six cylinders longitudinally mounted on a vehicle and disposed in series, the damping structure comprising: pistons reciprocatably fitted in the six cylinders, respectively; a crankshaft disposed below the pistons in a vertical direction of the vehicle, and coupled to the pistons via connecting rods, respectively, the crankshaft being rotatable about an axis; a cylinder block having a plurality of crank journal parts, the crank journal parts disposed below the crankshaft in the vertical direction, and configured to rotatably support the crankshaft between adjacent cylinders in the crankshaft; a flywheel fixed to a rear end of the crankshaft in a longitudinal direction of the vehicle; and a dynamic damper attached to a lower part of the cylinder block by only a single bolt; the dynamic damper provided only in at least one location between two adjacent cylinders among second through fourth cylinders, the six cylinders being disposed in an order of a first cylinder, the second cylinder, a third cylinder, the fourth cylinder, a fifth cylinder, and a sixth cylinder from a front side to a rear side in the longitudinal direction of the vehicle, wherein the dynamic damper includes: a stationary part attached to a lower part of the crank journal part and extending downwardly from the lower part of the crank journal part; a beam part connected to a lower part of the stationary part and extending in the longitudinal direction; and two mass parts connected to connecting parts of the beam part, on the front side and the rear side, respectively, in the longitudinal direction, and extending in a lateral direction of the vehicle while being separated from each other in the longitudinal direction, wherein the stationary part, the beam part, and the two mass parts are formed integrally, wherein the dynamic damper is made of cast iron and formed as an H-shape.

2. The damping structure of claim 1, wherein the stationary part has a pillar shape, and wherein the dynamic damper has a symmetrical shape with respect to a virtual plane, the virtual plane passing through a center axis of the pillar shape and intersecting perpendicularly to the longitudinal direction.

3. The damping structure of claim 1, wherein, when the beam part and the two mass parts are seen in a side view from one side in the lateral direction, a thickness of the beam part in the vertical direction is smaller than a thickness of each of the two mass parts in the vertical direction.

4. The damping structure of claim 2, wherein, when the beam part and the two mass parts are seen both in a side view from one side in the lateral direction and a plan view from one side in the vertical direction, the beam part and the two mass parts form an H-shape as a whole.

5. The damping structure of claim 4, wherein, when the beam part and the two mass parts are seen both in the side view from the one side in the lateral direction and a plan view from one side in the vertical direction, the beam part and the two mass parts form an H-shape as a whole.

6. The damping structure of claim 1, wherein, when the beam part and the two mass parts are seen both in a side view from one side in the lateral direction and a plan view from one side in the vertical direction, the beam part and the two mass parts form an H-shape as a whole.

* * * * *